United States Patent [19]

Detloff

[11] Patent Number: 4,735,230

[45] Date of Patent: Apr. 5, 1988

[54] OVERFLOW VALVE SYSTEM

[76] Inventor: Richard M. Detloff, 3789 Ridgeview Ct., Virginia Beach, Va. 23452

[21] Appl. No.: 86,988

[22] Filed: Aug. 19, 1987

[51] Int. Cl.[4] ...................... F16K 43/00; F16K 31/18; F16K 33/00
[52] U.S. Cl. ........................................ 137/315; 4/508; 137/426; 137/428; 137/432; 137/444
[58] Field of Search .............. 137/315, 414, 426, 428, 137/432, 443, 444; 4/391, 395, 403, 508

[56] References Cited

U.S. PATENT DOCUMENTS

| 2,521,794 | 9/1950 | Harvey | 137/426 |
|---|---|---|---|
| 2,842,158 | 7/1958 | Robinson | 137/428 |
| 3,176,707 | 4/1965 | Wilson | 137/428 |
| 3,194,070 | 7/1965 | Grant | 137/414 |
| 3,908,206 | 9/1975 | Grewing | 137/426 |
| 4,341,238 | 7/1982 | Roosa et al. | 137/414 |
| 4,471,798 | 9/1984 | Johannesen | 137/426 |
| 4,574,405 | 3/1986 | Tams | 4/508 |
| 4,586,532 | 5/1986 | Tsolkas | 137/426 |

Primary Examiner—George L. Walton
Attorney, Agent, or Firm—Griffin, Branigan & Butler

[57] ABSTRACT

An overflow valve system (10) comprises a tubular housing (12) having a J-shaped pipe fitting (14) mounted therein having an injection nozzle (24) at a first pipe-fitting end (26) located in a housing bore (40) of the tubular housing near the bottom thereof for injecting liquid axially upwardly in the housing bore and having a second pipe fitting-end (30) located outside of the tubulary-shaped housing (12). The injection nozzle has female threads therein for meshing with male threads of a toilet-flush ballcock (18), said threads meeting national standards for threads on ballcock shanks and nuts for water-closet bowls, tanks and urinals whereby a standard water-closet ballcock can be sealingly mounted in the overflow valve system by screwing it into the nozzle for controlling the flow of water through the pipe fitting into the bore. The overflow valve system further includes a bracket (16) attached to the wall of the tubulary-shaped housing for hanging the overflow valve system on the wall of a tank in which liquid level is to be controlled.

10 Claims, 2 Drawing Sheets

OVERFLOW VALVE SYSTEM

BACKGROUND OF THE INVENTION

This invention relates generally to the art of overflow valve systems, and provides such a system which can be portably moved from one tank or pool to another to control the flow of liquid therein through hoses.

It has long been a problem for above-ground swimming pool owners, as well as for users of other liquid tanks, to fill the tanks without fear of overflowing them. In this respect, filling large tanks often requires a great deal of time, thus, those in charge of filling such tanks often leave hoses turned on in the tanks while they do other things, with the thought that they can periodically check the tanks to see if they are yet full. Unfortunately, it often occurs that such people forget that they are filling tanks and fail to monitor them, thereby overflowing them. It is an object of this invention to provide an overflow valve which can be easily hooked to a liquid source pipe, such as a flexible hose, and placed in a swimming pool or tank for automatically controlling the level of liquid to which the tank is to be filled by the source pipe.

A number of overflow valve systems have been suggested for use with swimming pools which hang on the sides of the swimming pools, examples of such overflow valve systems being described in U.S. Pat. Nos. 2,842,158 to Robinson, 3,908,206 to Grewing, 4,586,532 to Tsolkas, and 3,176,707 to Wilson. However, all of these overflow valve systems include specialized valves operated by floats in conjunction with specialized housings. The valves thereof would be relatively expensive to manufacture and, since they are specialized valves, difficult to make widely available to the public. It is an object of this invention to provide an overflow valve system which utilizes an off-the-shelf valve which is readily available in all communities and which is already manufactured in such large numbers that it, and parts thereof, would be readily, and relatively inexpensively, available to the public.

Further, it is an object of this invention to provide an overflow valve system which is extremely inexpensive to manufacture because it has relative few uncomplicated parts, some of which are off-the-shelf.

It is a further object of this invention to provide an overflow valve system which is sturdy, accurate in operation, and extremely easy to repair.

SUMMARY

According to principles of this invention, a tubulary-shaped housing has a pipe fitting therein which includes an upwardly directed injection nozzle located near a bottom end of the tubularly-shaped housing for injecting liquid axially upwardly into a housing bore. The nozzle has female threads therein for meshing with male threads of a shank of a water-closet ballcock valve, the threads meeting national standards for threads on ballcock shanks and nuts for water closet bowls. In a preferred embodiment, the pipe fitting is J-shaped and located substantially entirely in the bore of the tubulary-shaped housing with only a second pipe fitting end extending above the tubulary-shaped housing that will accept an adapter permitting a connection to a garden hose or other plumbing connectors for permanent installations. An inverted U-shaped bracket is attached to the tubularly-shaped housing on the outer surface thereof for hanging the overflow valve on a tank in which the liquid level is to be controlled by the overflow valve.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 2:
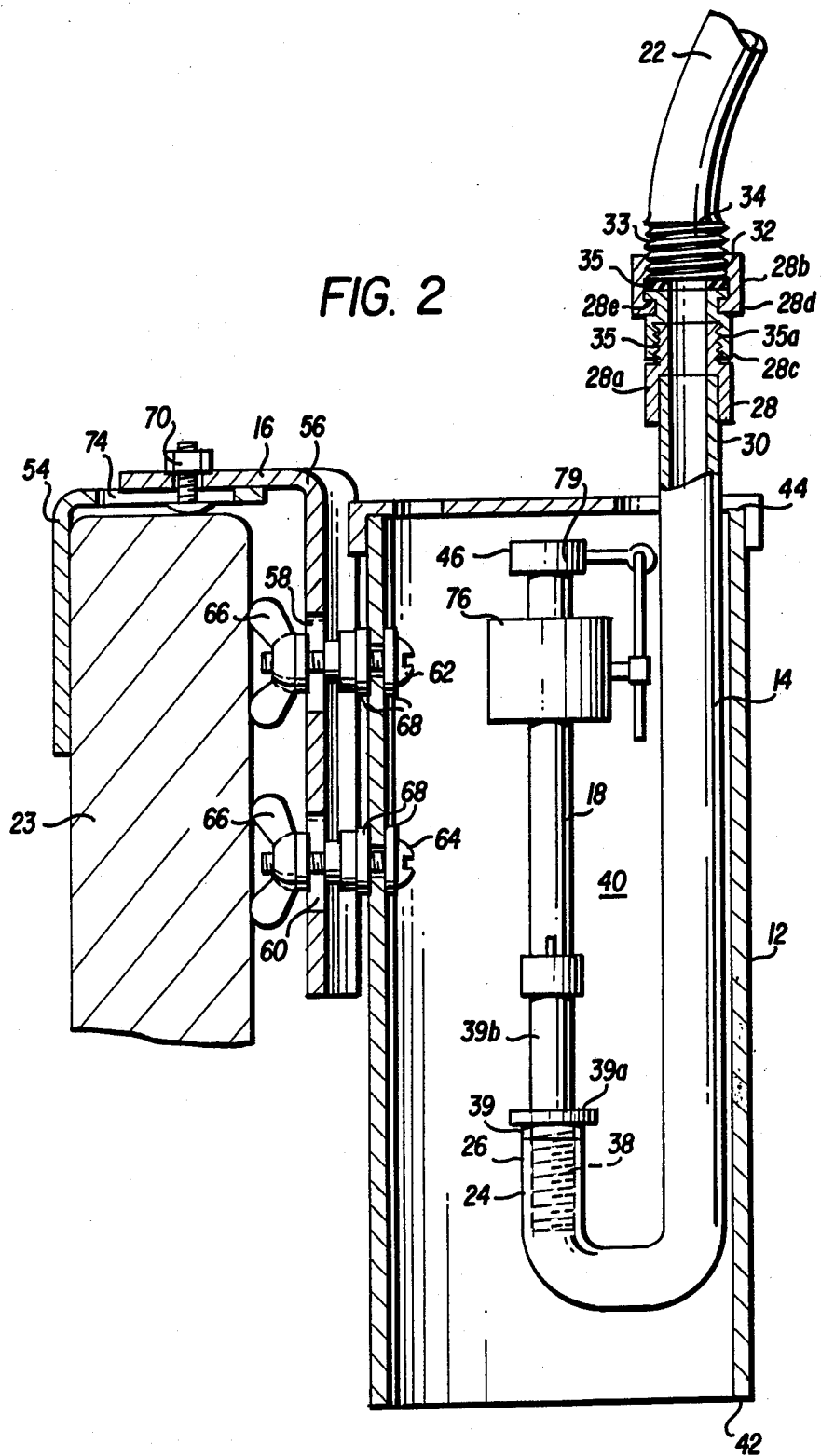
FIG. 2 is a cross-sectional view of the overflow valve system of FIG. 1 when hung inside a tank from the wall thereof and attached to a supply hose with a hose adapator; and, FIG. 3 is a partially cross-sectional view of an inverted U-shaped bracket of the overflow valve system of FIGS. 1 and 2 in a mode for hanging it on a thin tank wall.

An overflow valve system 10 of this invention includes a tubularly-shaped housing 12, a J-shaped pipe fitting 14, an inverted U-shaped hanging bracket 16, a standard toilet, flush, ballcock (or flush valve) 18, and a housing cap 20. Also shown in FIG. 2 is a supply hose 22, and a tank or swimming pool wall 23.

The tubulary-shaped housing 12 is formed of, off-the-shelf, PVC, 6–8 inch drain pipe which is cut to a length somewhat longer than the length of a standard, toilet, flush, ballcock.

The J-shaped pipe fitting is a specially formed, one inch outer diameter, ¾ inch inner diameter, PVC plastic pipe fitting which, as shown in the drawings, has a J-shape with an injection nozzle 24 being located at a first pipe-fitting end 26 and a supply attachment arrangement 28 located at a second pipe fitting end 30. The supply attachment arrangement 28 could be female threads cut directly in the second pipe-fitting end 30 which mesh with male threads of a standard coupling 34 of a garden hose 22. However, in the depicted embodiment it comprises a plastic adapter 28a, which is adhered to the second pipe-fitting end 30, and a two-piece metallic hose adaptor 28b, which includes first and second adaptor elements 28c and 28d. The second adaptor element 28d rotates in an annular slot 28e on the first adaptor element 28c and has female threads 32 for meshing with male threads of coupling 34 of the hose 22. A rubber washer 35 provides a seal between the first adaptor element 28c and the hose coupling 34. The first adaptor element 28c has female threads 35 for meshing with male threads 35a of the plastic adaptor 28a. The plastic adaptor 28a snugly fits on the second pipe fitting end 30 for being adhered thereto. This attachment arrangement 28 provides flexibility and convenience in that by using various other adaptors rather than plastic adaptor 28a the J-shaped pipe fitting 14 can be attached to various supply sources, such as plastic pipe for permanent installations. Also, the swivel, two piece, metallic, adaptor 28b allows relative rotation for easily screwing the second adaptor element 28d on the hose coupling 34. Standard adaptors 28a for making the transition to various sizes from the one inch pipe fitting 14 are commercially available.

The injection nozzle 24, on the other hand, has special, 3 inch long, female threads 36 cut or molded therein which meet the national standard for threads on ballcock nuts. That is, these special female threads 36 are cut to mesh with male threads 38 at the bottom end of a shank of a standard water closet ballcock 18. The American National Standards are as follows:

THREADS ON BALLCOCK SHANKS AND NUTS
BALLCOCK SHANKS

| Nominal Shank Size | External Thread Designation | Major Diameter of Shank | | Pitch Diameter of Shank | |
|---|---|---|---|---|---|
| | | Maximum | Minimum | Maximum | Minimum |
| $\frac{15}{16}$ | $\frac{15}{16}$ — 14NS — 1 | 0.9354 in. (23.759 mm) | 0.9214 in. (23.404 mm) | 0.8890 in. (22.581 mm) | 0.8820 in. (22.403 mm) |

BALLCOCK LOCKNUTS AND COUPLING NUTS

| Nominal Size | Internal Thread Designation | Pitch Diameter of Nut | | Minor Diameter of Nut | |
|---|---|---|---|---|---|
| | | Maximum | Minimum | Maximum | Minimum |
| $\frac{15}{16}$ | $\frac{15}{16}$ — 14NS — 1 | 0.8981 in. (22.812 mm) | 0.8911 in. (22.634 mm) | 0.8679 in. (22.045 mm) | 0.8602 in. (21.849 mm) |

In this respect, the male threads 38 of a standard ballcock shank normally are almost three inches long to pass through the bottom wall of a toilet tank, receive a nut on the outside of the toilet tank, and receive a water pipe at the bottom end thereof. However, in the case of this invention, the male threads 38 of the standard toilet ballcock 18 are screwed directly to the injection nozzle 24 of the J-shaped pipe fitting 14 until a rubber washer 39 is clamped between a flange 39a on a shank 39b of the ballcock 18 and the tip edge of the first pipe-fitting end 26 to provide a seal therebetween.

Figure 1:
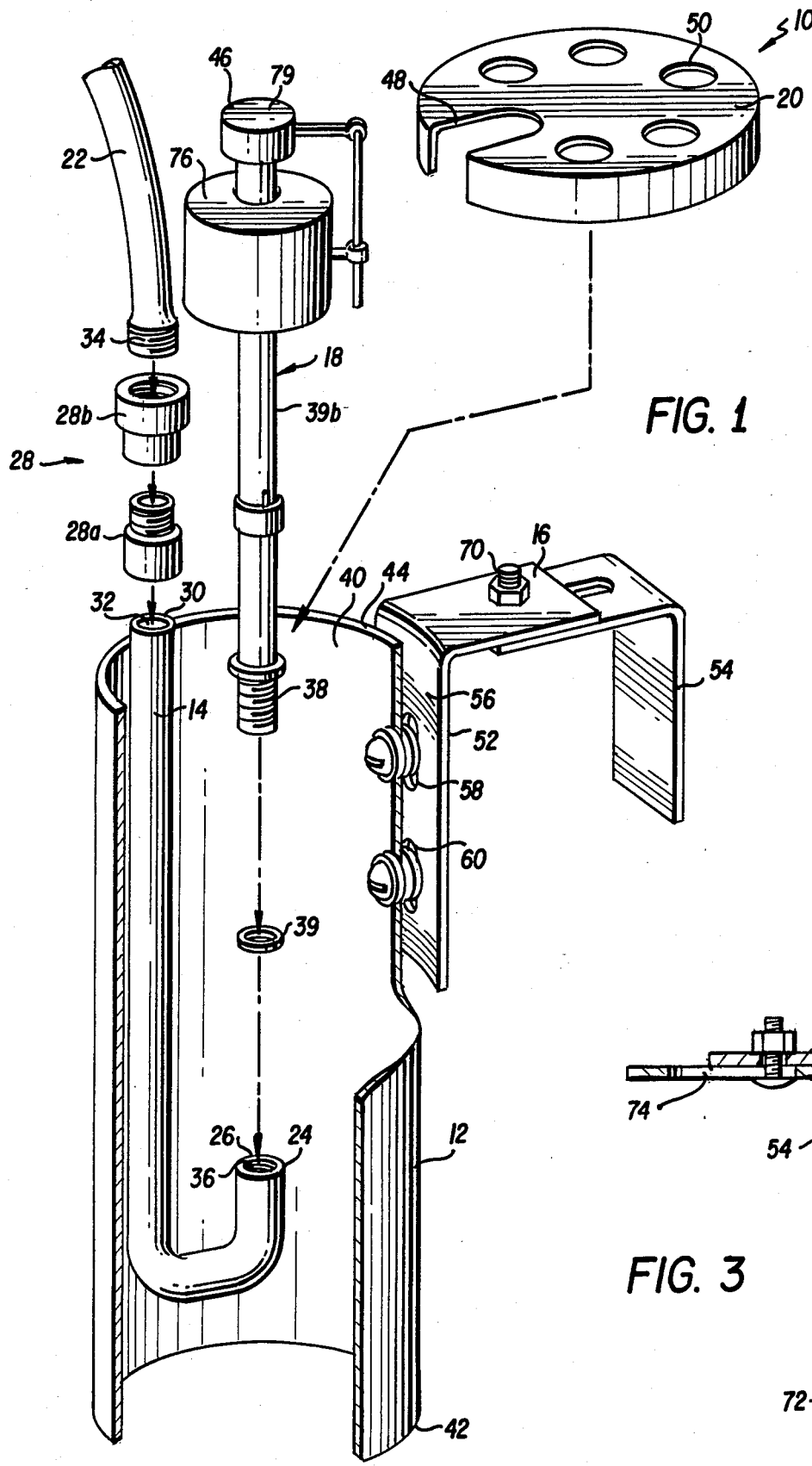
FIG. 1 is an exploded isometric view of an overflow valve system of this invention.

The J-shaped pipe fitting 14 is mounted in a bore 40 of the tubularly-shaped housing 12 by adhering it to the interior surface of the tubulary-shaped housing 12 as is depicted in FIGS. 1 and 2. In this respect, the J-shaped pipe fitting 14 is so shaped and dimensioned that the first pipe-fitting end 26 thereof is located near a bottom end 42 of the tubulary-shaped housing 12 and is directed axially upwardly approximately in the center of the bore 40 toward a top end 44 of the housing 12, while the second pipe fitting end 30 is located above the top end 44 of the tubularly-shaped housing 12 so that one has easy access to the female threads 32 thereat for attaching the hose couplings 34 thereto. The injection nozzle 24 is sufficienty spaced from the top end 44 of the tubulary-shaped housing 12 so that when the standard toilet ballcock 18 is screwed into the injection nozzle 24, a top end 46 thereof does not extend above the top end 44 of the tubulary-shaped housing 12. It is possible to provide lateral supports or flanges (not shown) for the J-shaped pipe fitting 14 which are also adhered, or glued, to the tubularly-shaped housing 12 to prevent the J-shaped pipe fitting 14 from rotating therein.

The housing cap 20 fits on the top end 44 of the tubulary-shaped housing 12 and has a cut-out 48 therein for accommodating the J-shaped pipe fitting 14. Such housing caps are standard and commercially available for 6 inch to 8 inch pipe. Further, the housing cap 20 has holes 50 through which the ballcock 18 be partially viewed. The cap, which would normally be about 6-8 inches above a desired water surface, would prevent items from being inserted into the top end of the tubularly-shaped housing 12, and thereby protects the ballcock.

Ballcocks of the type which can be used herein are described in U.S. Pat. Nos. 3,194,070 to Grant and 4,341,238 to Roosa et al., although other toilet-flush float valves which include water-supply vertical tubular shanks on which floats are mounted for vertical movement could be used.

Figure 3:
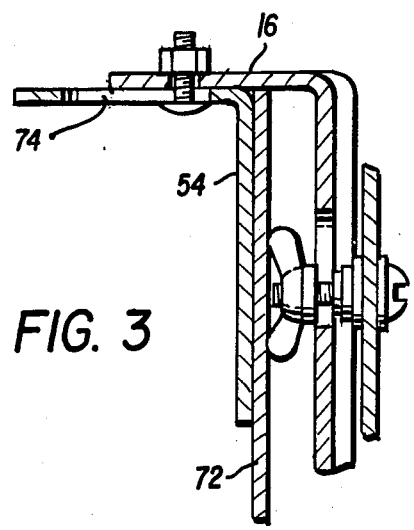

The hanging bracket 16 is comprised of two L-shaped brackets 52 and 54. The first L-shaped bracket 52 has an arm 56 with a semicircular configuration for matching the circular configuration of the tubularly-shaped housing 12. The arm 56 has elongated slots 58 and 60 therein through which bolts 62 and 64 pass. The bolts 62 and 64 pass through the tubularly-shaped housing 12, at a position opposite to that of the the J-shaped pipe fitting 14 so as to mount the hanging bracket 16 thereto. The hanging bracket 16 can be adjusted axially along the tubulary-shaped housing 12 by loosening wing nuts 66 on the bolts 62 and 64, sliding the arm 56 along the slots 58 and 60 and retightening the wing nuts 66. Rubber washers 68 are used to protect the wall of the tubularly-shaped housing 12 when the wing nuts 66 are tightened and metal washers are used to provide appropriate spacing between the hanging bracket 16 and the tubularly-shaped housing 12. The second L-shaped bracket 54 is attached to the first L-shaped bracket 56 by means of a bolt 70 so as to form an inverted U which can be hung on the tank wall 23. If it is desired to hang the overflow valve system 10 on a thin wall 72, as is shown in FIG. 3, the bolt 70 can be loosened, the second L-shaped bracket 54 can be slid and rotated at a slot 74 on the bolt 70 so as to position the second L-shaped bracket 54 as depicted in FIG. 3 for holding the bracket 16 firmly on the thin wall 72.

In operation, the overflow valve system 10 is assembled by screwing the male threads 38 of the shank 39b of a standard, shank-type, ballcock 18 into the special female threads 36 of the injection nozzle 24 of the J-shaped pipe fitting 14. Thereafer, the housing cap 20 is placed on the top end 44 of the tubulary-shaped housing 12 and a coupling 34 of a supply hose 22 is coupled to the female threads 32 at the second pipe-fitting end 30. The overflow valve system 10 is then hung on a tank or swimming pool wall 23 in the manner shown in either of FIGS. 2 or 3 with the tubularly-shaped housing 12 being adjusted on the hanging bracket 16 to adjust the proper level of liquid to be controlled in the tank 23. Thereafter, liquid is supplied through the supply hose 22 which is allowed to pass through a bore in the shank 39b of the standard toilet ballcock 18, since a float 76 thereof is in a lowered, non-floating position. Once liquid level within the tank or pool wall 23 reaches the float 76, it begins to move the float 76 upwardly until it eventually closes a valve 79, turning off liquid flowing through the bore in the vertical shank 78 of the standard toilet ballcock 18. Thus, the overflow valve system 10 of this invention easily controls flow of liquid through the supply hose 22 into the tank 23.

While the invention has been particularly shown and described with reference to a preferred embodiment, it will be understood by those skilled in the art that various changes in form and detail may be made therein without departing from the spirit and scope of the invention. For example, it would be possible to shape the tubularly-shaped housing 12 somewhat differently from that shown in the drawings. Further, the hanging bracket can be different. Also, there are many types of standard toilet ballcocks, or flush valves, which could be used with this invention so long as they are the type having threads at the lower end of a shank thereof which pass through a bottom wall of a toilet tank for being attached thereto by a nut on the opposite side of the toilet tank. It would be possible to include a separate coupler having threads at the injection nozzle 24 in the manner of the second pipe-fitting end 30 rather than having threads cut directly in the pipe fitting 14. Also, it would be possible to cut threads directly in the second pipe fitting end 30 if it were properly molded. Further, it would be possible to use the valve system described herein in a permanent installation rather than with a portable, hang-on, arrangement as is described herein. Similarly, the system does not have to be mounted directly in a container in which it controls liquid level, but rather can be merely placed in communication with such a container and placed at a level at which the level in the container is to be set. This could be done by capping the bottom end 42 of the housing 12 and running a tube therefrom to the tank whose level is to be controlled. Also, an intermediate member having plastic bolts molded therewith could be glued to the outside surface of the housing 12 and the hanging bracket 16 could be mounted thereon. In this respect, the bolts for the hanging bracket 16 need not be one above the other but could rather be in sets of two beside each other. There could be a vertical row of such bolt pairs running down the side of the housing 12, each pair to be used for a different liquid height. With regard to different liquid heights, some commercially available toilet ballcocks have provisions for allowing the adjustment of liquid height. Such ballcock adjustment could provide a fine adjustment while mounting screws for the housing 12 provide a rough adjustment.

It will be appreciated by those skilled in the art that the overflow valve system described herein is extremely uncomplicated in structure and can be easily repaired by screwing out the standard toilet ballcock 18 and screwing in a new one. Such toilet, flush, ballcocks are readily available in most hardware stores. This device is inexpensive to manufacture, since most elements thereof are off-the-shelf.

The embodiments of the invention in which an exclusive property or privilege are claimed are defined as follows:

1. An overflow valve system for preventing the filling of a liquid container through a supply tube above a predetermined level, said system comprising:
   a housing defining an enclosed housing cavity having a top housing end and a bottom housing end;
   a bracket attached to a surface of said housing for mounting said housing in communication with said liquid container at approximately the level at which flow of liquid being supplied to said contaier via said supply tube is to be interrupted;
   a pipe fitting attached to the wall of said housing, said pipe fitting having at a first pipe-fitting end an injection nozzle located in said housing cavity near the bottom housing end for injecting liquid axially upwardly in said housing cavity, said nozzle having a thread means for providing female threads for meshing with male threads of a shank of a water-closet ballcock and thereby providing a sealed attachment therebetween so that liquid flowing from said nozzle flows through a bore of said ballcock shank, said female threads meeting national standards for threadably engaging male threads on national-standard ballcock-shanks, said pipe fitting having at a second pipe-fitting end an attachment means for attaching said pipe fitting to said supply tube for furnishing liquid to said nozzle;
   whereby, a standard water closet ballcock can be mounted in or removed from said overflow valve system by screwing it onto or off said nozzle from within said housing without removing elements of said bracket and said housing, said ballcock, when mounted on said nozzle, controlling the flow of water through said pipe fitting into said housing cavity to not exceed said predetermined level.

2. An overflow valve system as in claim 1, wherein said bracket has an inverted U shape which allows said valve system to be hung on the wall of said liquid container and thereby be hung directly in said container, the bottom end of said housing bore being open.

3. An overflow valve system as in claim 2, wherein said U-shaped bracket comprises two L-shaped pieces having legs fastened together at a point about which said legs can be pivoted, one of said legs being atttached to said housing and the other leg extending away therefrom, said other leg being pivotal about said attachment means so as to make said U shape large or small depending on the size of a wall on which said overflow valve system is to be hung so as to allow said overflow valve system to be hung from different size liquid tank walls.

4. An overflow valve system as in claim 3 wherein the vertical position of said housing on said bracket is adjustable vertically to control the desired water level.

5. An overflow valve system as in claim 2 wherein said pipe fitting is J-shaped with the second end of said pipe fitting being positioned above a top end of said housing.

6. An overflow valve system as in claim 5 wherein all of said pipe fitting is in said housing bore except that which extends above the top of the housing.

7. An overflow valve system as in claim 1 wherein said pipe fitting is J-shaped with the second end of said pipe fitting being positioned above a top end of said housing and being of a standard plumbing diameter to accept commercially available pipe-fitting adapters.

8. An overflow valve system as in claim 1 wherein all of said pipe fitting is in said housing bore except that which extends above the top of the housing.

9. An overflow valve system as in claim 1 wherein is further included a standard water closet ballcock which is attached to said thread means of said injection nozzle.

10. An overflow valve system as in claim 1 wherein said housing is tubularly shaped.

* * * * *